May 19, 1936.  M. N. PACK  2,040,874
ACOUSTIC TENSIOMETER
Filed March 27, 1934  3 Sheets-Sheet 1
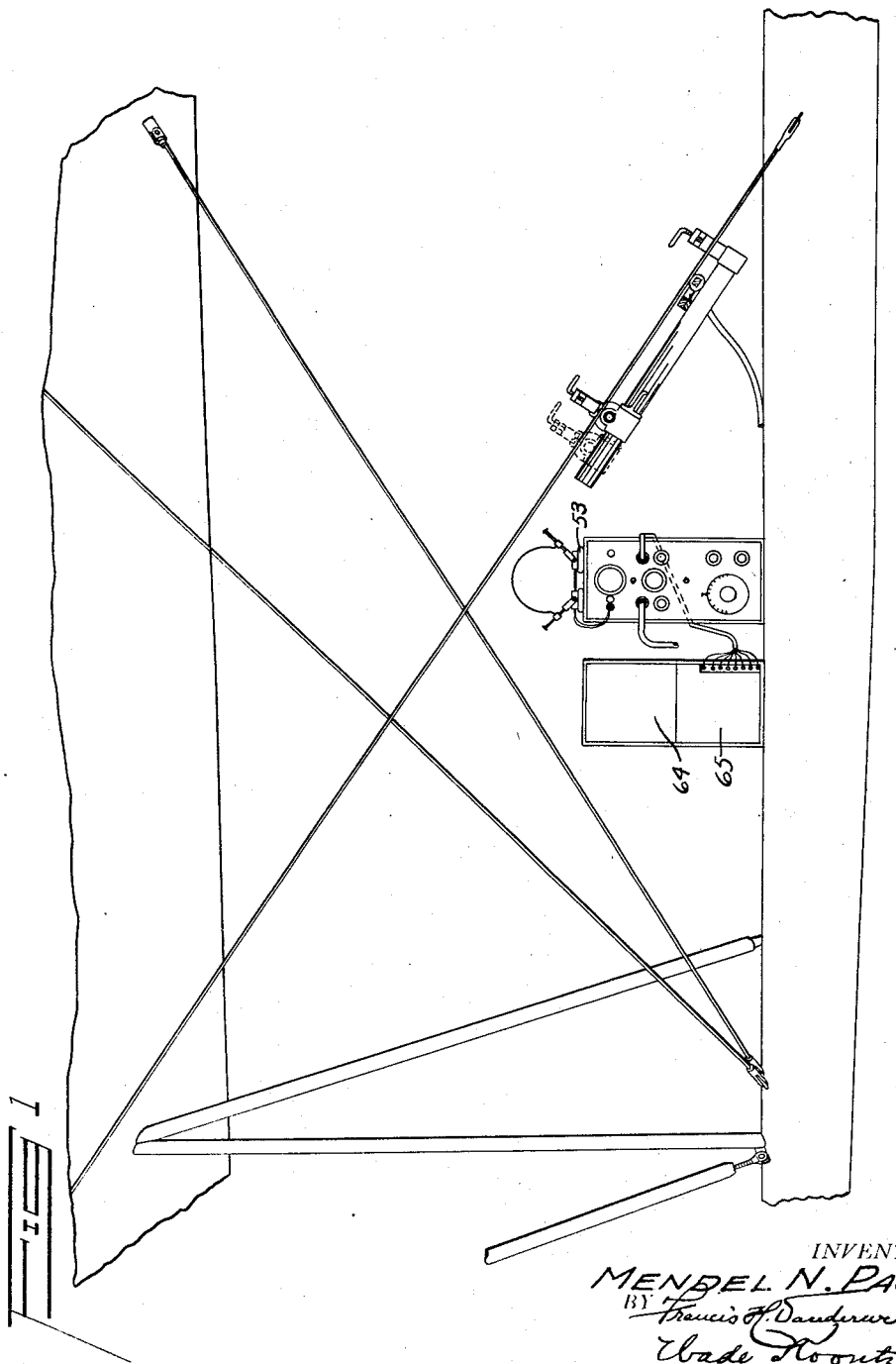
INVENTOR
MENDEL N. PACK
ATTORNEYS May 19, 1936.  M. N. PACK  2,040,874
ACOUSTIC TENSIOMETER
Filed March 27, 1934  3 Sheets-Sheet 2
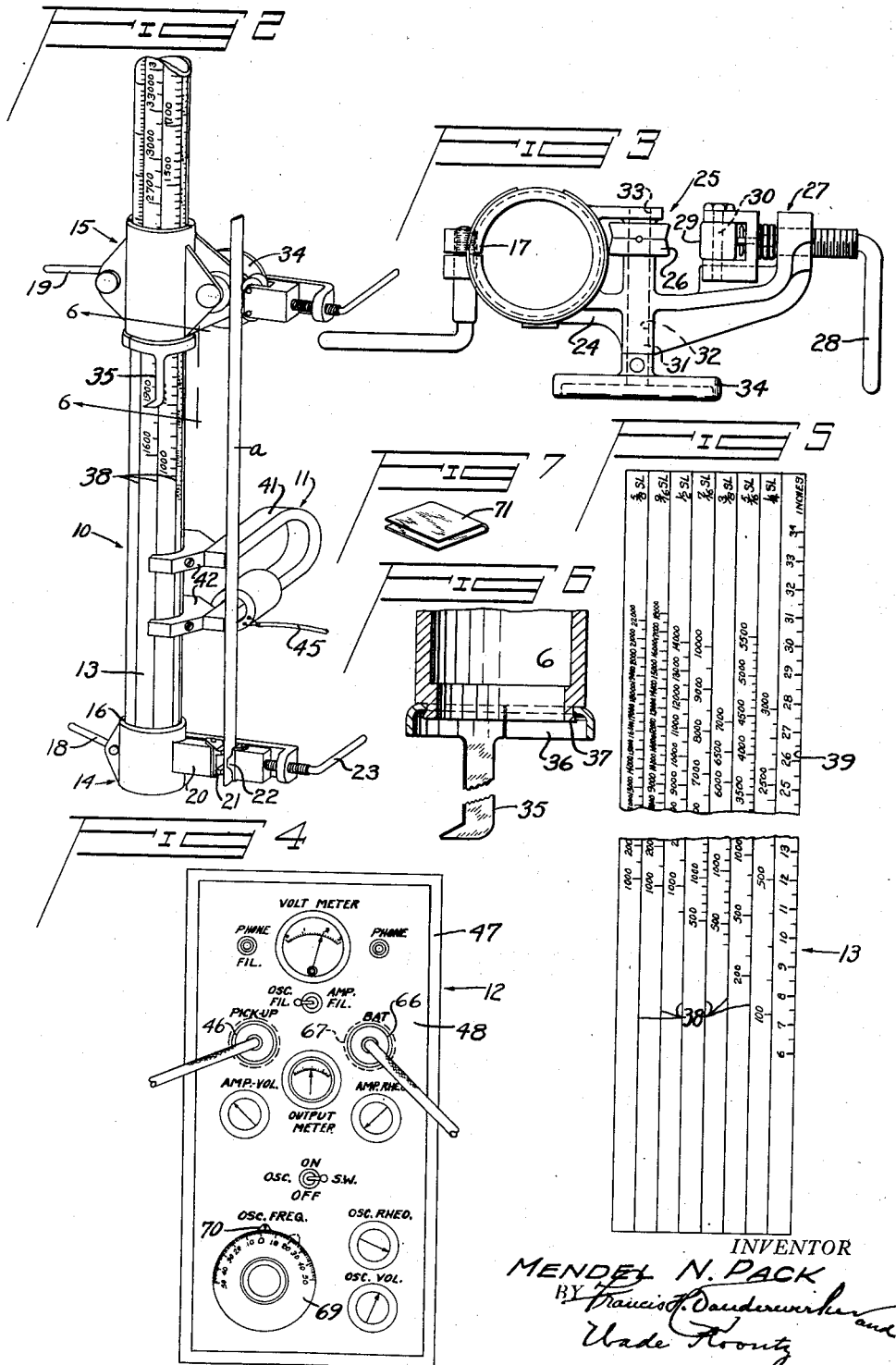

May 19, 1936.  M. N. PACK  2,040,874
ACOUSTIC TENSIOMETER
Filed March 27, 1934   3 Sheets-Sheet 3
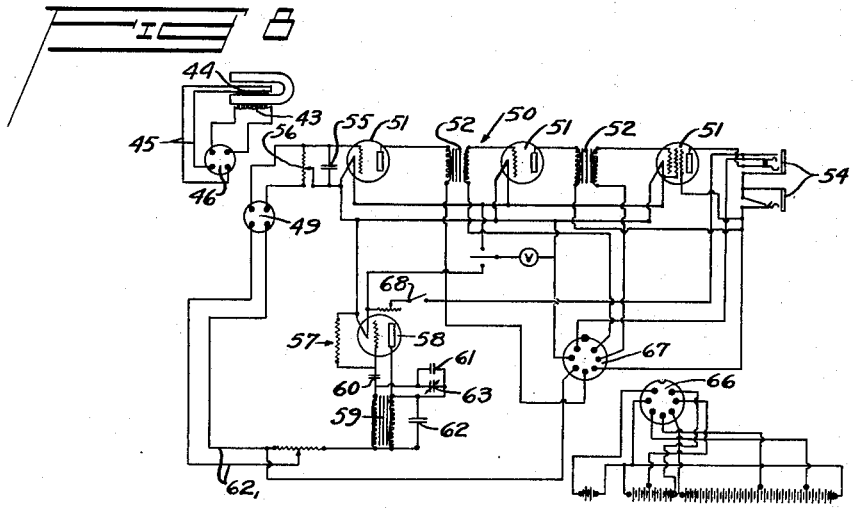
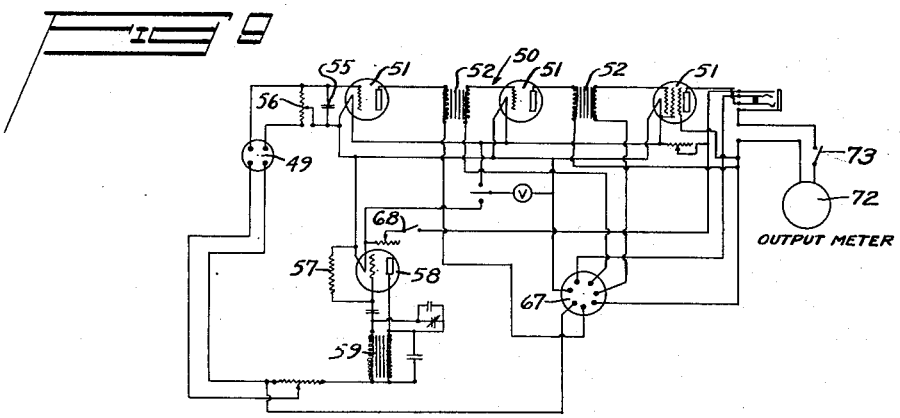
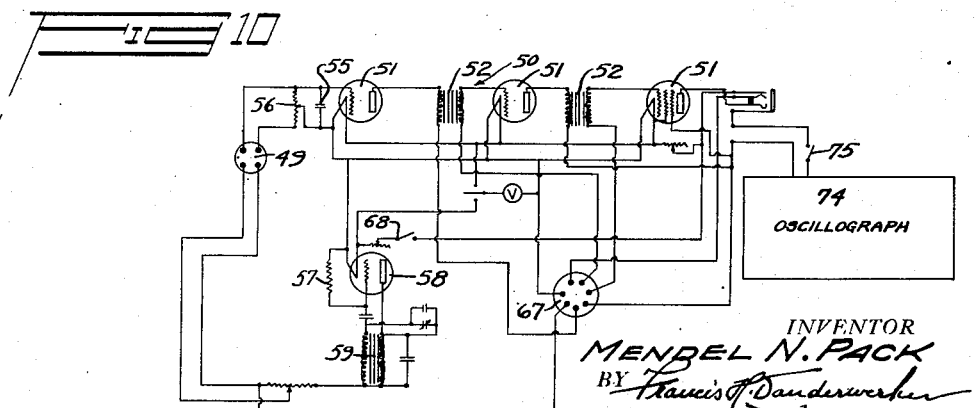
INVENTOR
MENDEL N. PACK
BY
ATTORNEYS Patented May 19, 1936

2,040,874

UNITED STATES PATENT OFFICE 2,040,874

ACOUSTIC TENSIOMETER

Mendel N. Pack, Dayton, Ohio

Application March 27, 1934, Serial No. 717,602

23 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to measuring instruments, and more particularly to instruments for measuring the stress in a member under tension, such for example, as wires, propellers or any other object or objects having mass and elasticity.

In providing an instrument for determining the stress in a member under tension, advantage is taken of the fact that an elastic body or mass under tension when plucked or excited into vibration and subsequently allowed to vibrate in a magnetic field, generates an alternating E. M. F., the frequency of which is the natural frequency of the vibration of the body. By utilizing this alternating E. M. F., it is possible to obtain an audible note or signal in a pair of earphones or other sensitive reproducers capable of being compared with a musical note of known frequency in determining the frequency of vibration of the body.

The primary object of the present invention is to provide in an instrument of this character, means for acoustically comparing the natural frequency of vibration of any given length of a vibratory section with a standard of known frequency, in order to determine the frequency of vibration of the vibratory structure.

A further object of the present invention is to provide in an instrument of this character, means for determining the stress in a member under tension by exciting said member to cause it to vibrate in its natural frequency of vibration, and embodying means for translating the vibration of said member into a musical note made audible through the use of ear phones, means for developing a second musical note of a known frequency for comparison with said first mentioned note and further means under manual control for changing the natural frequency of vibration of said vibratory section to bring its note into resonance with the note of known frequency.

A still further object of the present invention is to provide a measuring instrument capable of being used as a tensiometer for tie-rods or other members having mass and elasticity, means being provided in the instrument for reading directly the stress in the member being tested without resorting to the use of tables or charts or requiring mathematical calculation.

A further object of the present invention is to provide an instrument capable of measuring the stress in a member under tension and which can be applied at any place along the length of the member being tested where the load is the same at any place along its length. This is of particular importance when testing tie-rods as used on aircraft. The member being tested need be vibrated through only a small portion of its length. By so doing the harmful effects on the structure, which may otherwise occur should the member be vibrated through large amplitudes, are eliminated. Thus, in the case of tie-rods as used on aircraft, the anchorages for the rod and fairing used in connection therewith need not be removed in determining its stress.

A further object of the present invention is to provide in an instrument of this character, calibrated means for indicating directly the tension in members of different sizes and shapes, said means comprising a support of light weight material, a fixed clamping member and a movable, manually controlled clamping member for clamping therebetween different portions of the length of the member being tested, the movable clamping member being provided with a pointer capable of being adjusted to register on any one of a plurality of scales provided on said support.

With these and other objects in view which will appear as the nature and advantages of the invention is better disclosed, the invention consists in the features of construction, combination and arrangement of parts hereinafter fully described and claimed, reference being had to the accompanying drawings in which:

Fig. 1 is an assembled view of my invention illustrating the manner of determining the stress in the brace wires of the wings of an aircraft.

Fig. 2 is an enlarged detail view of the support with clamping members attached for clamping therebetween predetermined lengths of the wire to be tested.

Fig. 3 is an enlarged detail top view of one of the clamping members.

Fig. 4 is a detailed view of the tuning instrument.

Fig. 5 is a pattern illustrating the arrangement of scales on the clamp support for different gage wire.

Fig. 6 is a sectional view taken on the line 6—6 of Fig. 2.

Fig. 7 is a detail of the adapter used in connection with my invention when the member being tested is of non-magnetic material.

Fig. 8 is a wiring diagram of the oscillator circuit and audio amplifying circuit used in connection with my invention.

Fig. 9 is a wiring diagram similar to that shown in connection with Fig. 8 and including an output meter for visually indicating when the produced notes are in resonance.

Fig. 10 is a wiring diagram similar to that shown in Fig. 8 and including an oscillograph for producing permanent records of the produced notes.

Referring more particularly to the drawings wherein corresponding parts are designated by like numerals throughout the several views thereof, the instrument in one embodiment of my invention comprises essentially a clamping device 10, electromagnetic pickup 11 and tuning instrument generally indicated by the numeral 12.

As shown more particularly in Fig. 2 the clamping device comprises essentially a supporting element 13 of light weight tubular material which is provided at its lower end with a primary clamping member 14 and at its upper end with a secondary clamping member 15. The primary and secondary clamping members are each formed with split body portions 16 and 17 respectively to permit sliding of the same on the supporting element 13. Each body portion is further provided with suitable means as indicated by the numerals 18 and 19 for clamping the respective body portions of the clamping members in desired position upon the supporting element 13.

The primary clamping member, as shown in Fig. 2, has formed integral therewith an extension 20 carrying a fixed inner clamping jaw 21 and an outer clamping jaw 22, adjustable toward and away from the fixed clamping jaw, through the medium of an adjusting screw 23. In this manner, as shown in Fig. 2, the wire to be tested, indicated by the letter "a", may be readily clamped between the jaws of the lower clamping member.

The upper clamping member 15, as shown more particularly in Fig. 3, has also formed integral therewith an extension 24 carrying a fixed inner clamping jaw 25 provided with a roller 26 and an outer clamping jaw 27, adjustable toward and away from the fixed inner clamping jaw through the medium of an adjusting screw 28. The outer clamping jaw, as will be noted, is also provided with a roller 29 mounted upon a transverse shaft 30 carried in the outer end of the clamping jaw.

The roller 26 is pinned or otherwise similarly secured to a transverse shaft 31, journaled in bearing portions 32 and 33 of the extension 24, the outer end of the shaft 31 having fixedly mounted thereon a hand wheel 34, the purpose of which will be hereinafter more fully set forth.

As will be noted the lower end of the body portion 17 of the upper clamping member 15 is provided with a pointer 35 provided with a split collar portion 36 adapted to be sprung over the shouldered lower end 37 of the body portion 17, as shown in Fig. 6. By reason of the construction it will be readily apparent that by rotation of the collar portion 36, the pointer 35 may be caused to register on any one of the several scales 38 calibrated for wires of known standard provided upon the periphery of the supporting element 13. As shown in Fig. 5, the scales 38 are calibrated for wires of different gage. The number of different sizes and shapes of wires which may be tested with one instrument is not limited to the number of calibrated scales which can be crowded on the supporting element 13, inasmuch as there is also provided a length scale 39. This scale may be used in conjunction with calibration curves for any number of wires of the sizes of which are not included in the range of the scale of standard.

Carried upon the supporting element 13 intermediate the clamping members 14 and 15, there is provided an electromagnetic pickup, generally indicated by the numeral 11. This pickup comprises essentially a conventional permanent horseshoe magnet 41 fixedly secured in a predetermined position on the supporting element 13 by means of suitable spacer blocks 42 of non-magnetic material screwed to the supporting element. The poles of the magnet are so positioned, as to location with respect to the fixed clamping jaws of the clamping members 14 and 15, such as to provide a small air gap between the poles of the magnet and the wire being tested when the latter is clamped between the jaws of the clamping member. Thus it will be apparent that the length of wire intermediate the clamping jaws of the upper and lower clamping members respectively will be free to vibrate in the magnetic field of the magnet. The primary winding 43 and the secondary winding 44 is wound in coil form about the one pole of the magnet as shown in Figs. 2 and 8, and adapted for connection with the tuning instrument indicated by the numeral 12 and for this purpose the ends of the primary and secondary coils are electrically connected to a cable 45 provided at its free end with a suitable adapter 46.

The tuning instrument 12 may, for convenience, be carried in a portable case generally indicated by the numeral 47 having mounted therein a panel 48 for mounting thereon in suitable fashion the electrical elements necessary to the proper functioning of the instrument as one adapted for measuring the stress in a member under tension.

Fig. 8 illustrates diagrammatically the manner in which the various elements are electrically connected to accomplish this end. As shown therein the adapter 46, which comprises essentially a four-prong base plug of conventional type is adapted for electrical connection with a four-prong base socket 49. In this manner, from an observation of Fig. 8, it will be noted that the ends of the primary winding 43 are electrically connected to the input end of a conventional audio amplifying circuit generally indicated by the numeral 50 and comprising a plurality of amplifying tubes 51, and audio transformers 52 for effecting an amplification of the current received at the input end of the circuit. From the description thus far it will be apparent that if the wire "a", as shown in Fig. 2, is plucked or struck by some blunt instrument, as, for example, a rubber mallet, and excited into vibration and subsequently allowed to vibrate in the steady magnetic field which exists between the north and south poles of magnet 41, such vibration of the wire generates an alternating E. M. F. in the windings of the coils, the frequency of which is the natural frequency of vibration of the wire, which through the medium of the audio amplifying circuit 50 is translated into a musical note in a pair of telephone receivers 53, as shown in Fig. 1, that may be connected to conventional telephone jacks 54 secured at the output end of the circuit.

To transmit certain desired frequencies, i. e., frequencies within the range of frequency of vibration of the wire being tested, and suppress all other frequencies of the E. M. F. generated, a fixed condenser 55 of suitable capacity is shunted across the input end of the circuit as shown in Fig. 8. In this manner undesired high frequencies are suppressed and frequencies in the desired range are transmitted into the audio circuit. There is also provided an amplifier volume control 56, which consists essentially of a potentiometer shunted across the input end of the circuit as shown in Fig. 8.

The tuning instrument also comprises an oscillatory circuit generally indicated by the numeral 57 which includes an audio oscillator 58, the output from the plate and grid of which circuit is connected through the transformer 59 and fixed condensers 60, 61 and 62 to the wires 62 leading to the secondary windings 44 heretofore mentioned. Thus an alternating E. M. F. is generated in the oscillating circuit and fed back into the audio amplifying circuit 50 and translated into a second musical note. The frequency of the note produced in the oscillatory circuit may be controlled through the medium of the variable condenser 63. Thus a second musical note of known frequency is obtained for comparison with the note produced in the detector circuit heretofore mentioned. A cover 64 is provided for the case 47, provided with a compartment 65 within which may be conveniently mounted the necessary batteries for operating the circuits hereinabove set forth and as shown in Fig. 8, the cable leading from the batteries in the compartment 65 may be provided at its end with a plug receptacle generally indicated by the numeral 66 for electrically connecting the cable leading from the batteries to a terminal plug 67 carried upon the panel 48.

The operation of the instrument is as follows:—First the oscillator tube is turned on, which same may be accomplished through the medium of the switch 68, after which a tuning fork of predetermined pitch is set in vibration and held adjacent the poles of the magnetic pickup 11. At this time both the tone of the oscillator and that of the tuning fork will be heard simultaneously by the operator by means of the earphones 53. If the two tones are not in resonance, that is, do not coincide in frequency, beats will be heard. The dial 69 of the tuning condenser 63 is turned, adjusting the frequency of oscillation of the oscillator tube 58 until the beats are eliminated, thus indicating that the tuning fork and oscillator tube are in resonance as to frequency. An adjustable zero pointer 70 is provided in connection with the dial 69, which may, when resonance is obtained, be set at the zero indication on the dial 69. Thus if the dial is inadvertently moved from its original position, such error may be readily corrected. After the oscillator tube is adjusted to emit a musical note the frequency of which is known, the wire "a", or other object under test is set in vibration by striking it with a mallet and the tone emitted by the wire is compared with the tone emitted by the oscillator tube by listening to the two tones alternately or simultaneously through the earphones. If the two tones are of decidedly different pitch, the difference will be easily detected. Under these circumstances the movable clamping member 15 may then be shifted in such direction as to bring the pitch of the two tones closer together. This may be readily accomplished by turning the hand wheel 34 manually either clockwise or counter-clockwise to cause the roller to rotate and move the clamping member 15 either up or down, consequently increasing or decreasing the vibrating length of the wire between the primary fixed clamping member 14 and secondary or movable clamping member 15. When the two tones are nearly alike in pitch, beats will be heard and as the movable clamping member is further adjusted, the beats will be entirely eliminated. At this time with the pointer adjusted in the manner heretofore described to indicate on the correct scale, the stress or load in the member under test may be read directly from the scale.

When the wire or other object being tested is of non-magnetic material, I have provided a non-magnetic adapter 71, as shown in detail in Fig. 7, made of magnetic material which may be readily fastened to the wire so that the efficiency of the electromagnetic pickup will be maintained at maximum efficiency.

Fig. 9 illustrates a modification of the wiring diagram as shown in Fig. 8. In this modification there is provided an output meter 72 which may be connected in series with the output of the audio amplifying circuit, which may be turned on or off by the switch 73. In this manner a visual indication will be obtained of the difference between the note produced in the oscillator tube and that produced in the electromagnetic pickup. That is to say, as long as a difference exists between the two notes, the needle of the output meter will gradually move either to right or left. When the beats produced by the notes are entirely eliminated, the needle will become stationary, and indicate that resonance has been attained.

Fig. 10 illustrates a still further modification of the wiring diagram illustrated in Fig. 8. In this modification of the invention the output from the audio amplifying circuit has connected thereto an oscillograph 74 capable of being turned on or off by the switch 75. In this manner a permanent record of the notes produced may be obtained.

I claim:

1. In a measuring instrument, means for producing a constant magnetic field, a vibrating element of fixed tension associated with said magnetic field to produce an alternating E. M. F., a detector circuit for translating said alternating E. M. F. into a musical note, an oscillatory circuit associated with said detector circuit for emitting a second musical note, and means for tuning one of said circuits to bring the frequencies of the notes of both circuits into resonance with respect to one another.

2. In a measuring instrument, means for producing a constant magnetic field, a vibrating element of fixed tension associated with said magnetic field to produce an alternating E. M. F., a detector circuit for translating said alternating E. M. F. into a musical note, an oscillatory circuit associated with said detector circuit for emitting a second musical note, and means for tuning said oscillatory circuit to bring the note emitted therefrom into resonance with said first mentioned note.

3. In a measuring instrument, means for producing a constant magnetic field, a vibrating element of fixed tension associated with said constant magnetic field to produce an oscillating E. M. F., a detector circuit for translating said alternating E. M. F. into a musical note, an oscillatory circuit associated with said detector circuit for emitting a second musical note, means for tuning one of said circuits to bring the frequencies of the notes of both circuits into resonance and means associated with said last mentioned means for indicating said frequency.

4. In a measuring instrument, means for producing a constant magnetic field, a vibrating element of fixed tension associated with said constant magnetic field to produce an alternating E. M. F., a detector circuit for translating said alternating E. M. F. into a musical note, an oscillatory circuit associated with said detector circuit, means for tuning said oscillatory circuit to emit a second musical note of a desired known frequency and means for tuning said detector circuit to bring its note into resonance with said last mentioned note.

5. In a measuring instrument, means for producing a constant magnetic field, a vibrating element of fixed tension associated with said constant magnetic field to produce an alternating E. M. F., a detector circuit for translating said alternating E. M. F. into a musical note, an oscillatory circuit associated with said detector circuit, means for tuning said oscillatory circuit to emit a second musical note of a desired known frequency, means for tuning said detector circuit to bring its note into resonance with said last mentioned note and means associated with said oscillatory circuit tuning means for indicating the frequency of its emitted note.

6. In a measuring instrument, means for producing a constant magnetic field, a vibrating element of fixed tension, means for mounting said vibrating element adjacent said constant magnetic field, means to produce an alternating E. M. F., a detector circuit for translating said alternating E. M. F. into a musical note, an oscillatory circuit coupled to said detector circuit, means for tuning said oscillatory circuit to emit a second musical note of a desired known frequency and means for tuning said detector circuit to bring its note to resonance with said last mentioned note.

7. In a measuring instrument, means for producing a constant magnetic field, a vibrating element of fixed tension associated with said constant magnetic field to produce an alternating E. M. F., a detector circuit for translating said alternating E. M. F. into a current of one frequency, an oscillatory circuit associated with said detector circuit for emitting a second current having a different frequency, means for tuning one of said circuits to bring the frequency of its current into resonance with the frequency of the other current and visual means common to said circuits for indicating when the frequency of said currents are identical.

8. In a measuring instrument, means for producing a constant magnetic field, a vibrating element of fixed tension associated with said constant magnetic field to produce an alternating E. M. F., a detector circuit for translating said alternating E. M. F. into a current of one frequency, an oscillatory circuit associated with said detector circuit for emitting a second current having a different frequency, means for tuning said oscillatory circuit to bring the frequency of its current into resonance with the frequency of the other current and visual means common to said circuits for indicating when the frequency of said currents are identical.

9. In a measuring instrument, means for producing a constant magnetic field, a vibrating element of fixed tension associated with said constant magnetic field to produce an alternating E. M. F., a detector circuit for translating said alternating E. M. F. into a current of one frequency, an oscillatory circuit associated with said detector circuit for emitting a second current having a different frequency, means for tuning said detector circuit to bring the frequency of its current into resonance with the frequency of the current emitted by said oscillatory circuit and visual means common to said circuits for indicating when the frequencies of said currents are identical.

10. In a measuring instrument, means for producing a constant magnetic field, a vibrating element of fixed tension associated with said constant magnetic field to produce an alternating E. M. F., a detector circuit for translating said alternating E. M. F. into a current of unknown frequency, an oscillatory circuit associated with said detector circuit, means for tuning said oscillatory circuit to emit a second current of a fixed known frequency, means for tuning said detector circuit to bring the frequency of its current into resonance with the current of known frequency and visual means common to said circuits for indicating when the frequency of said currents are identical.

11. In a measuring instrument, means for producing a constant magnetic field, a vibrating element of fixed tension associated with said constant magnetic field to produce an alternating E. M. F., a detector circuit for translating said alternating E. M. F. into a current of unknown frequency, an oscillatory circuit associated with said detector circuit, means including a variable condenser for tuning said oscillatory circuit to emit a second current of a fixed known frequency, means for tuning said detector circuit to bring the frequency of its current into resonance with the current of known frequency, visual means common to said circuits for indicating when the frequency of said currents are identical and further means cooperating with said variable condenser for indicating directly the frequency of said currents when in resonance.

12. In a measuring instrument, means for producing a constant magnetic field, a vibrating element of fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means including a manually controlled mechanism for changing the frequency of vibration of said vibrating element whereby the musical note of said detector circuit is caused to correspond with the second musical note of known frequency.

13. In a measuring instrument, means for producing a constant magnetic field, a vibrating element of fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means including a manually controlled mechanism for varying the effective vibrating length of said vibrating element to change the frequencies of vibration of the musical note translated by said detector circuit and produce a note corresponding to the musical note of known frequency.

14. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means including a manually controlled mechanism for varying the effective vibrating length of said vibrating element to change the frequency of vibration of the musical note translated by said detector circuit and produce a note corresponding to the musical note of known frequency and calibrated means for indicating the tension in said vibrating element when said musical notes are in resonance.

15. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means including a manually controlled mechanism for changing the frequency of vibration of said vibrating elements, said means comprising a fixed clamping member and a movable clamping member for varying the effective vibrating length of said vibrating element whereby the musical note translated by said detector circuit is caused to correspond to the musical note of known frequency.

16. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a current of unknown frequency, an oscillatory circuit associated with said detector circuit, variable means for tuning said oscillatory circuit to emit a second current of a desired known frequency, said mounting means including a manually controlled mechanism for changing the frequency of vibration of said vibrating element comprising a fixed clamping member and a movable clamping member for varying the effective vibrating length of said vibrating element, whereby the frequency of the current translated by said detector circuit is caused to correspond to the known current frequency and visual means for indicating when the frequencies of said currents are identical.

17. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a current of unknown frequency, an oscillatory circuit associated with said detector circuit, variable means for tuning said oscillatory circuit to emit a second current of a desired known frequency, said mounting means including a manually controlled mechanism for changing the frequency of vibration of said vibrating element comprising a fixed clamping member and a movable clamping member for varying the effective vibrating length of said vibrating element whereby the frequency of the current translated by said detector circuit is caused to correspond to the known current frequency, means associated with said movable clamping member for indicating directly the tension in said vibrating element and visual means for indicating when the frequencies of said currents are identical.

18. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means including a manually controlled mechanism for changing the frequency of vibration of said vibrating element comprising a fixed clamping member and a movable clamping member for varying the effective vibrating length of said vibrating element whereby the musical note translated by said detector circuit is caused to correspond to the musical note of known frequency, visual means for indicating when the frequencies of said notes are identical and further means associated with said movable clamping member for indicating directly the tension in said vibrating element, said last mentioned means comprising a pointer carried by said movable clamping member and a calibrated scale cooperating with said pointer for indicating said tension.

19. In a measuring instrument, means for producing a constant magnetic field, a vibrating element under a fixed tension, means for mounting said vibrating element for vibration in said constant magnetic field to produce an alternating E. M. F., a detector circuit for translating said alternating E. M. F. into a musical note of unknown frequency, an oscillatory circuit associated with said detector circuit, variable means for tuning said oscillatory circuit to emit a second musical note of a desired known frequency, said mounting means comprising a support, a manually controlled mechanism on said support for changing the frequencies of vibration of said vibrating element comprising a fixed clamping member and a movable clamping member for varying the respective vibrating length of said vibrating element whereby the musical note translated by said detector circuit is caused to correspond to the musical note of known frequency, and means associated with said movable clamping member for indicating directly the tension in said vibrating element, said means comprising a plurality of scales calibrated in terms of tension for vibrating elements of different mass and a pointer carried by said movable clamping member and adjustable relative thereto to indicate on any one of said scales the stress in any vibrating element of different mass.

20. A testing device for determining the stress in a vibratory structure under a given tension comprising a support, a plurality of clamping members on said support for clamping therebetween variable lengths of the vibratory structure to vary the natural frequency of vibration, electro-magnetic means carried by said support and responsive to the vibration of said vibratory structure for translating the frequency of vibration of said vibratory structure into a musical note and means associated with one of said clamping members for indicating directly stress in said vibratory structure when said structure produces a note of predetermined frequency.

21. A testing device for determining the stress in a vibratory structure under a given tension comprising a support, clamping means on said support for clamping therebetween variable lengths of the vibratory structure to vary its natural frequency of vibration comprising a fixed clamping member and a movable clamping member, electro-magnetic means carried by said support and responsive to the vibration of said vibratory structure for translating the frequency of vibration of said structure into a musical note and means associated with said movable clamping member for indicating directly the stress in said vibratory structure when the latter produces a note of predetermined frequency.

22. A testing device for determining the stress in a vibratory structure under a given tension comprising a support, a plurality of clamping means on said support for clamping therebetween variable lengths of the vibratory structure to vary its natural frequency of vibration comprising a fixed clamping member and a movable clamping member, electromagnetic means carried by said support and responsive to the vibration of said vibratory structure for translating the frequency of vibration of said structure into a musical note, and means associated with said movable clamping member for indicating directly the stress in said vibratory structure when the latter produces a note of predetermined frequency, said last mentioned means comprising a pointer carried by said movable clamping member and a calibrated scale on said support over which said pointer operates for indicating directly stress in said vibratory structure when the latter produces a musical note of a predetermined frequency.

23. A testing device for determining the stress in a vibratory structure under a given tension comprising a support, clamping means on said support for clamping therebetween variable lengths of the vibratory structure to vary its natural frequency of vibration comprising a fixed clamping member and a movable clamping member, electromagnetic means carried by said support and responsive to the vibration of said vibratory structure for translating the vibrations of said vibratory structure into a musical note, means associated with said movable clamping member for indicating directly the stress in the structure being tested when the latter produces a note of predetermined frequency, said means comprising a plurality of scales calibrated in terms of tension for vibratory structures of different mass and elasticity and a pointer carried by said movable clamping member and adjustable relative thereto to indicate on any one of said scales.

MENDEL N. PACK.